US010243244B2

(12) United States Patent
DeKeuster et al.

(10) Patent No.: US 10,243,244 B2
(45) Date of Patent: Mar. 26, 2019

(54) SYSTEMS AND METHODS FOR BONDING METAL PARTS TO THE POLYMER PACKAGING OF A BATTERY MODULE

(71) Applicant: Johnson Controls Technology Company, Plymouth, MI (US)

(72) Inventors: Richard M. DeKeuster, Racine, WI (US); Robert J. Mack, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 122 days.

(21) Appl. No.: 15/226,646

(22) Filed: Aug. 2, 2016

(65) Prior Publication Data
US 2017/0125862 A1 May 4, 2017

Related U.S. Application Data

(60) Provisional application No. 62/250,632, filed on Nov. 4, 2015.

(51) Int. Cl.
*H01M 2/10* (2006.01)
*H01M 2/30* (2006.01)
(Continued)

(52) U.S. Cl.
CPC ..... *H01M 10/6551* (2015.04); *H01M 2/1077* (2013.01); *H01M 2/1094* (2013.01);
(Continued)

(58) Field of Classification Search
CPC .................................................. H01M 2/1094
See application file for complete search history.

(56) References Cited

U.S. PATENT DOCUMENTS 3,466,207 A   9/1969   Vincent et al.
4,106,833 A * 8/1978   Wilson .................. H01M 2/202
                                                    324/426
(Continued)

FOREIGN PATENT DOCUMENTS

JP    2001225352    8/2001
JP    2010244894    10/2010
WO    2002045186    6/2002

OTHER PUBLICATIONS

Machine Translation of JP 2010-244894 (Mar. 23, 2018) (Year: 2018).*

(Continued)

Primary Examiner — Matthew J Merkling
(74) Attorney, Agent, or Firm — Fletcher Yoder, P.C.

(57) ABSTRACT

The present disclosure relates to bonding or sealing metal parts to the polymer packaging of certain battery modules. The present disclosure includes a battery module having a polymer packaging with an interior and exterior and a plurality of battery cells disposed within the interior of the polymer packaging. The battery module includes a metal part that extends from the interior to the exterior of the polymer packaging and is in thermal or electrical contact with at least a portion of the plurality of battery cells. The metal part includes a bonding surface that is secured to an overmolded portion of the polymer packaging, wherein the bonding surface has a microsurface roughness that hermetically seals the bonding surface of the metal part to the overmolded portion of the polymer packaging.

16 Claims, 5 Drawing Sheets

(51) Int. Cl.
*H01M 10/613* (2014.01)
*H01M 10/625* (2014.01)
*H01M 10/6551* (2014.01)
*H01M 10/6554* (2014.01)
*H01M 10/6561* (2014.01)

(52) U.S. Cl.
CPC ......... *H01M 2/305* (2013.01); *H01M 10/613* (2015.04); *H01M 10/625* (2015.04); *H01M 10/6554* (2015.04); *H01M 2/307* (2013.01); *H01M 10/6561* (2015.04); *H01M 2220/20* (2013.01)

(56) References Cited

U.S. PATENT DOCUMENTS

| | | | |
|---|---|---|---|
| 6,267,790 B1 | 7/2001 | Daroux et al. | |
| 6,286,207 B1* | 9/2001 | Oura | C23C 18/1608 205/126 |
| 6,638,661 B2 | 10/2003 | Inoue et al. | |
| 8,859,139 B2 | 10/2014 | Asahina et al. | |
| 9,023,507 B2 | 5/2015 | Yoshitake et al. | |
| 9,065,110 B2 | 6/2015 | Kobayashi | |
| 9,065,160 B2 | 6/2015 | Kwak et al. | |
| 9,178,189 B2 | 11/2015 | Abe et al. | |
| 2002/0002772 A1 | 1/2002 | Hirano et al. | |
| 2007/0009794 A1* | 1/2007 | Takami | H01M 2/021 429/184 |
| 2007/0207379 A1* | 9/2007 | Hatta | H01M 2/0207 429/176 |
| 2008/0280198 A1 | 11/2008 | Kumar et al. | |
| 2011/0294367 A1 | 12/2011 | Moon et al. | |
| 2013/0071755 A1 | 3/2013 | Oguro | |
| 2013/0075026 A1 | 3/2013 | Chang et al. | |
| 2013/0078423 A1 | 3/2013 | Sutou et al. | |
| 2013/0252071 A1 | 9/2013 | Teramoto et al. | |
| 2014/0154535 A1* | 6/2014 | Olsson | H01M 2/1264 429/53 |
| 2014/0349147 A1* | 11/2014 | Shaffer, II | H01M 2/1094 429/56 |
| 2014/0363722 A1 | 12/2014 | Osaki | |
| 2016/0197373 A1 | 7/2016 | Shaffer, II et al. | |

OTHER PUBLICATIONS

PCT/US2016/047265 International Search Report and Written Opinion dated Dec. 9, 2016.

Yasuda, Kiyokazu et al., Effect of Surface Roughening of Aluminum Plates on the Strength of Bonds Formed Between Aluminum and Polyphenylene Sulfide by Thermosonic Bonding, IOP Science, 2013, pp. 1-7, http://iopscience.iop.org/article/10.1088/1757-899X/61/1/012007/pdf.

\* cited by examiner

SYSTEMS AND METHODS FOR BONDING METAL PARTS TO THE POLYMER PACKAGING OF A BATTERY MODULE

CROSS REFERENCE TO RELATED APPLICATIONS

This application claims priority from and the benefit of U.S. Provisional Application Ser. No. 62/250,632, entitled "MICRO SURFACE TREATMENT TO ALUMINUM COLD PLATE," filed Nov. 4, 2015, which is hereby incorporated by reference in its entirety for all purposes.

BACKGROUND

The present disclosure relates generally to the field of batteries and battery modules. More specifically, the present disclosure relates to bonding or sealing metal parts to the polymer packaging of battery modules, such as lithium-ion battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

Battery modules, such as those used in xEVs, typically include a packaging that houses and protects the internal components of the battery module (e.g., battery cells, bus bars, control circuitry) from the external environment. This packaging may be made of different materials, with polymer packaging affording particular advantages in terms of low production cost, high strength-to-weight ratio, and electrically insulative properties. Furthermore, the packaging of a battery module may be designed to have other target characteristics based on the expected use of the battery module, for example, in xEVs or other automotive applications. As such, a battery manufacturer may design the packaging of certain battery modules to be capable of effectively protecting the internal components of the battery module while withstanding a range of various environmental and operational conditions (e.g., moisture, high temperatures, low temperatures, vibration). Accordingly, any features disposed at the surface of the packaging should be sufficiently sealed to allow the battery module to pass quality control testing, in which the packaging is expected to retain its integrity as the battery module despite exposure to these harsh environmental and operational conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module having a polymer packaging with an interior and exterior and a plurality of battery cells disposed within the interior of the polymer packaging. The battery module includes a metal part that extends from the interior to the exterior of the polymer packaging and is in thermal or electrical contact with at least a portion of the plurality of battery cells. The metal part includes a bonding surface that is secured to an overmolded portion of the polymer packaging, wherein the bonding surface has a microsurface roughness that hermetically seals the bonding surface of the metal part to the overmolded portion of the polymer packaging.

The present disclosure also relates to a method of manufacturing a battery module, including performing microsurface treatment to roughen a bonding surface of a metal part. The method also includes overmolding a portion of a polymer packaging of a battery module to the bonding surface of the metal part to hermetically seal the metal part within the polymer packaging. The method further includes disposing a plurality of battery cells within the polymer packaging and electrically or thermally coupling the plurality of battery cells to the metal part to yield the battery module.

The present disclosure also relates to a battery module including a polymer packaging and a plurality of battery cells disposed within the polymer packaging. The battery module further includes a terminal assembly electrically coupled to the plurality of battery cells. The terminal assembly has a bonding surface secured to an overmolded portion of the polymer packaging, wherein the bonding surface of the terminal assembly comprises a microsurface roughness that hermetically seals the bonding surface of the terminal assembly to the overmolded portion of the polymer packaging.

DRAWINGS

Various aspects of this disclosure may be better understood upon reading the following detailed description and upon reference to the drawings in which.

Figure 7:
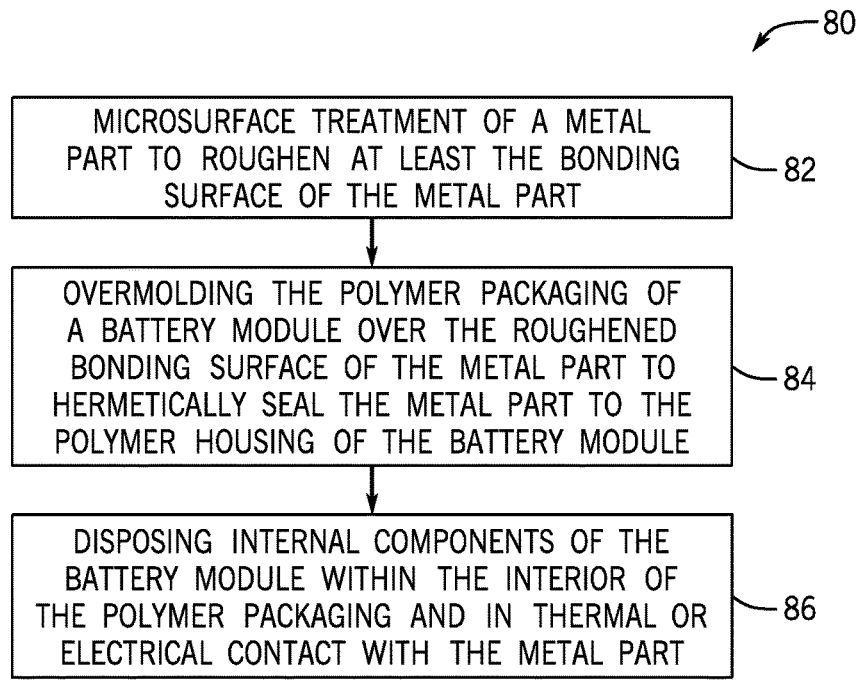
Figure 8:
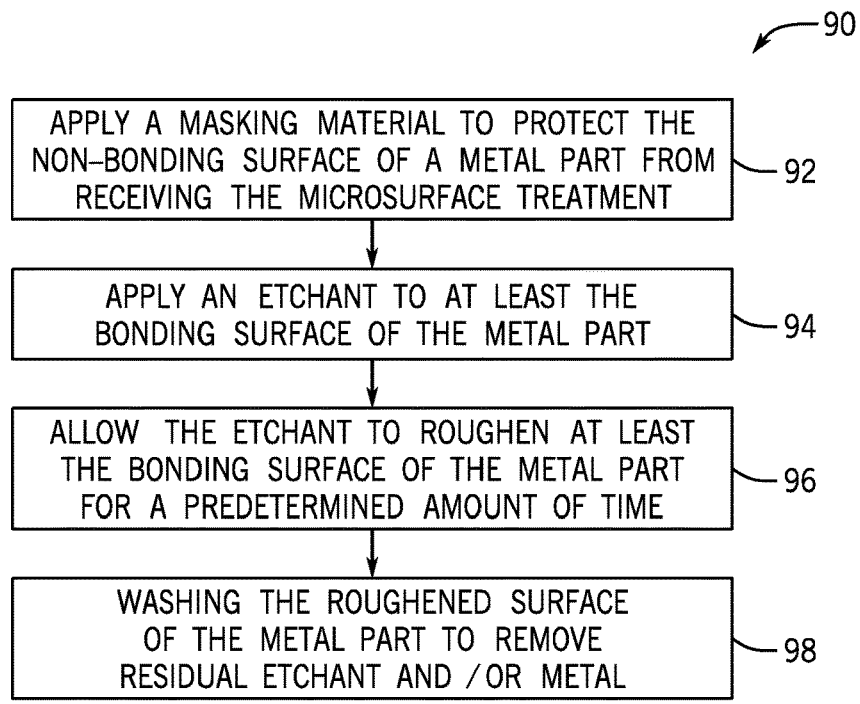

FIG. 7 is a flow diagram illustrating an example process for manufacturing a battery module that includes at least one microsurface-treated metal part integrated into the polymer packaging of the battery module, in accordance with embodiments of the present approach; and FIG. 8 is a flow diagram illustrating an example of a process for microsurface treatment of a metal part, in accordance with embodiments of the present technique.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, battery manufacturers may desire that the polymer packaging of a battery module be capable of effectively protecting the internal components of the battery module while withstanding various environmental and operational conditions, including exposure to dust and moisture. Additionally, battery manufacturers may desire to attach various metal features (e.g., cooling plates, terminal assemblies) to various internal and/or external portions of the polymer packaging. However, particularly for metallic features that extend all the way through the polymer packaging, the manufacturer may desire that the metal part be effectively sealed (e.g., bonded, adhered) to the packaging so that the ability of the packaging to isolate and protect the internal components of the battery module from certain aspects of the external environment (e.g., moisture, dust) is not compromised by the presence of the metal part.

Accordingly, present embodiments are directed toward systems and methods for overmolding a metal part in a manner that effectively seals the part to the polymer packaging without compromising the structural integrity of the battery module. As set forth in greater detail below, present embodiments involve microsurface treatment of at least the bonding surface of a metal part to enhance the surface roughness of this portion of the metal part prior to overmolding. As used herein, the "bonding surface" of a metal part refers to the portion of the surface of the metal part that directly contacts and bonds to (e.g., adheres to, seals to) an overmolded portion of the polymer packaging. As used herein, "microsurface modification," "microsurface treatment," or "microsurface roughening" generally refer to surface treatment that introduces micron-scale and/or sub-micron-scale (e.g., nano-scale) deformities (e.g., edges, pits, peaks, ridges, troughs), generally referred to herein as "microsurface roughness," into at least the bonding surface of a metal part, to increase the surface roughness/surface area of the treated surface. It is presently recognized that this microsurface treatment substantially improves bonding and sealing of metal parts that are overmolded into a portion of the packaging of a battery module, and may impart other benefits as well, such as improved thermal contact. As such, the present technique is especially applicable to certain metal parts, such as the cooling plates and terminal assemblies discussed below, which extend all the way through a portion of the polymer packaging and, therefore, risk of compromising the desired water-tight sealing of the packaging in the absence of the present disclosure. It should be appreciated that the present technique is applicable to any metal part (e.g., terminals, interconnects, structural supports) of the battery module that would benefit by being secured to (e.g., bonded to, integrated within) the polymer packaging of the battery module.

Figure 1:
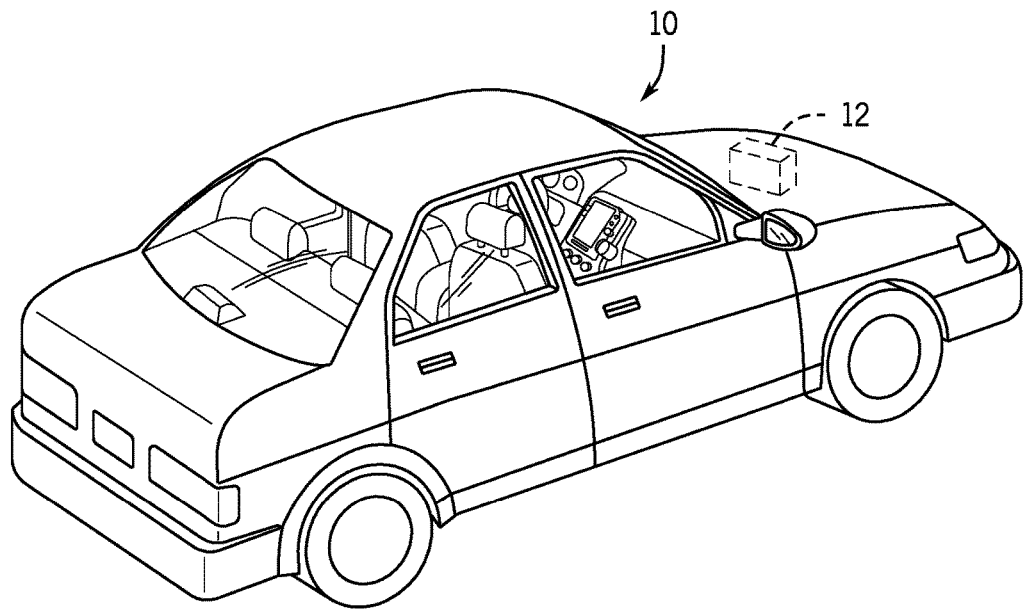
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
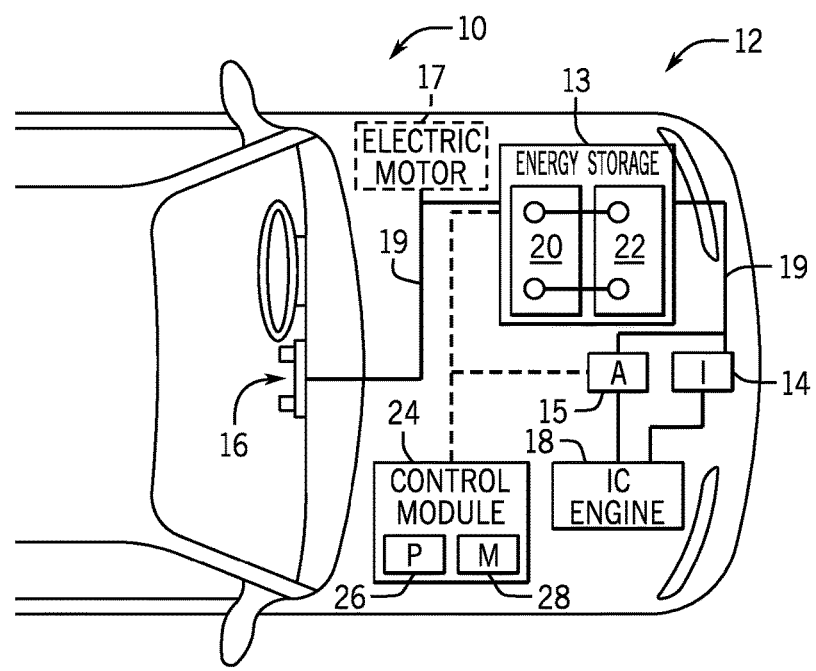
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
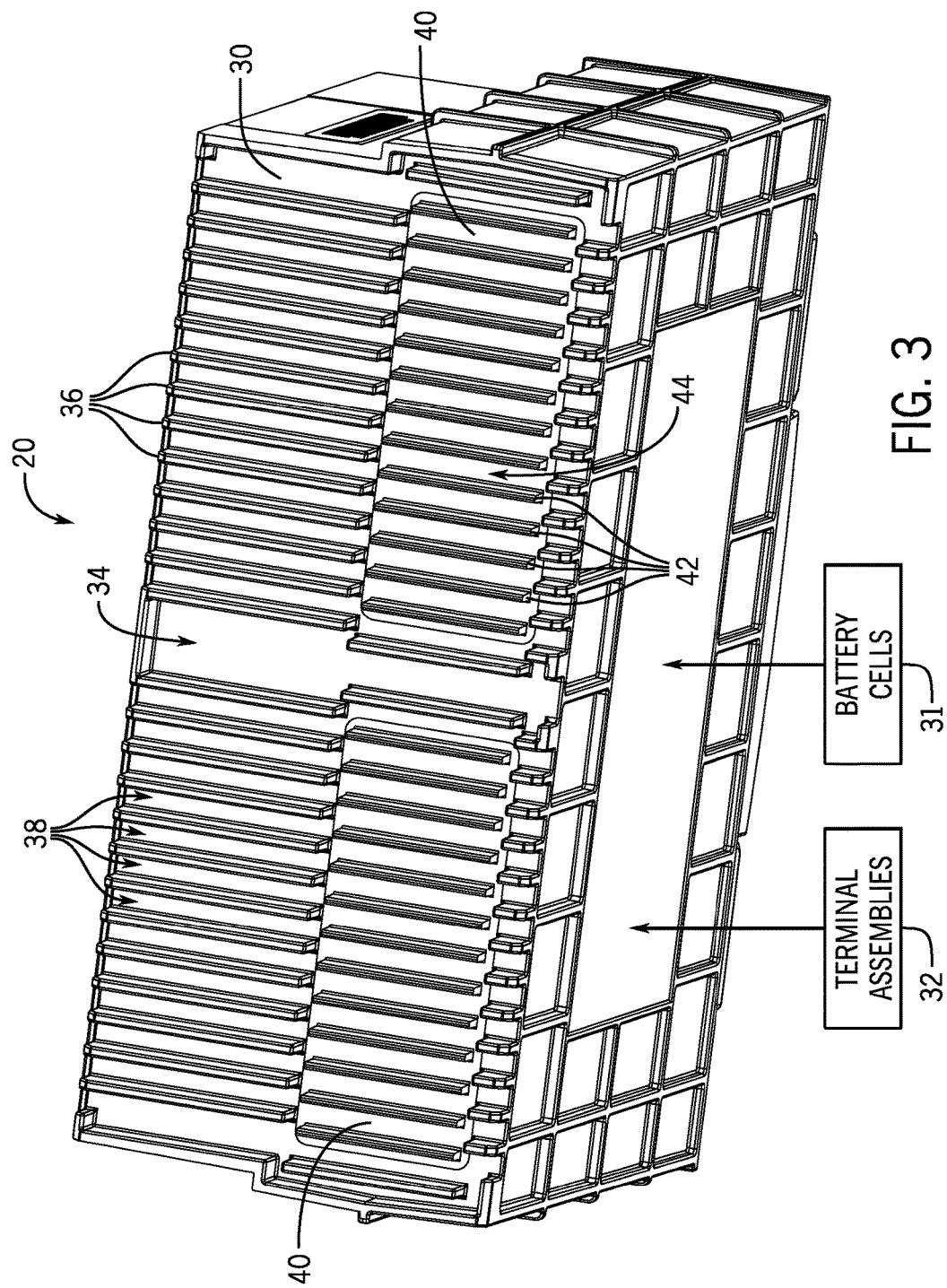
FIG. 3 is a perspective view of the bottom portion of the polymer packaging of a battery module, in accordance with embodiments of the present approach.

With the foregoing in mind, FIG. 3 illustrates a perspective view of a battery module 20 having a polymer packaging 30, in accordance with embodiments of the present approach. In certain embodiments, the polymer packaging 30 include polypropylene, polypropylene with glass fiber, Nylon 66, or another suitable polymer. More specifically, FIG. 3 illustrates the bottom portion 34 (a base) of the polymer packaging 30 of the battery module 20. Accordingly, the battery cells 31 schematically illustrated in FIG. 3 are disposed within the interior of the polymer packaging, while the terminal assemblies 32 schematically illustrated in FIG. 3 are disposed on the top portion (e.g., cover) of the battery module 20. Since the battery module 20 is generally designed to sit or rest on bottom portion 34, the illustrated battery module 20 includes a number of polymer fins 36 (e.g., footings) that generally extend perpendicularly from the bottom surface 34 and generally extend perpendicularly relative to the length of the battery module 20.

For the embodiment illustrated in FIG. 3, the polymer fins 36 are generally designed to cooperate to support the weight of the battery module 20 such that the battery module 20 does not directly rest flat on the bottom portion 34 of the polymer packaging 30. As such, the polymer fins 36 enable an air flow 38 to pass underneath the bottom portion 34 of the battery module 20, which facilitates cooling of the battery module 20 during operation. In certain embodiments, the air flow 38 may be created actively (e.g., via an external fan) or passively (e.g., via convection), in accordance with the present disclosure.

In addition to the polymer fins 36, the battery module 20 illustrated in FIG. 3 includes two metallic cooling plates 40 positioned beside one another along the bottom portion 34 of the polymer packaging 30. In other embodiments, any number of cooling plates 40 may be used. In certain embodiments, the cooling plates 40 may be made of copper, aluminum, or nickel, or combinations thereof (e.g., nickel-plated copper). As discussed in greater detail below, the illustrated cooling plates 40 are overmolded to the polymer packaging 30 of the battery module 20 along their edges, bonding or sealing the cooling plates 40 into the packaging 30. As such, in certain embodiments, heat-producing components of the battery module 20 (e.g., battery cells, control circuitry, power transforming circuitry) can be positioned to be in direct physical and/or thermal contact with the internal surface of the cooling plates 40. By specific example, in certain embodiments, a bottom surface of each of the battery cells of the battery module 20 may directly contact an internal surface of the cooling plates 40. In certain embodiments, one or more thermal transfer layers or thermal transfer materials, such as thermal epoxy or a thermal gap pad, may be disposed directly between the battery cells and the internal surfaces of the cooling plates 40 to improve thermal transfer, reduce vibration, or a combination thereof.

The illustrated cooling plates 40 each include a number of heat fins 42 that stand substantially perpendicular from the front side 44 (e.g., the exterior surface) of the cooling plates 40. The heat fins 42 of the cooling plates 40 generally function to dissipate heat that is produced by the internal components of the battery module 20 into the surrounding environment. As such, the air flow 38 that is channeled by the polymer fins 36 flows across the heat fins 42, absorbing and removing excess thermal energy from the heat fins 42, effectively cooling the battery module 20.

Figure 4:
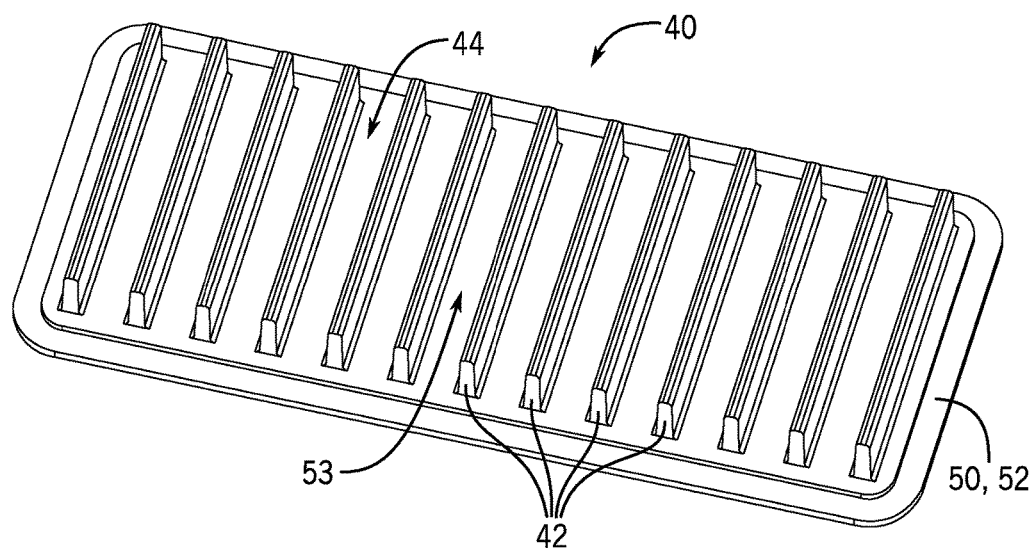
FIG. 4 is a perspective view of a cooling plate prior to microsurface treatment, in accordance with embodiments of the present approach.

As mentioned, the cooling plates 40 are overmolded to the polymer packaging 30 of the battery module 20 along their edges or perimeters. FIG. 4 illustrates a perspective view of a cooling plate 40 prior to microsurface treatment, in accordance with embodiments of the present approach. As discussed with respect to FIG. 3, the embodiment of the cooling plate 40 illustrated in FIG. 4 includes the heat fins 42 extending substantially perpendicularly from the front side 44 (e.g., the exterior surface) of the cooling plate 40. Unseen in FIG. 3, FIG. 4 also illustrates a flange 50 that runs along the perimeter of the cooling plate 40. It may be appreciated that this flange 50 is not visible in FIG. 3 since the polymer packaging 30 of the battery module 20 overmolds this flange 50, obstructing it from view. For the illustrated embodiment of FIG. 4, the flange 50 may be referred to as the bonding surface 52 of the cooling plate 40, since it is the region that directly contacts (e.g., bonds to, adheres to) the polymer packaging 30 of the battery module 20 during the overmolding process. Other embodiments may not include a flange 50; however, the flange 50 may be beneficial from the standpoint of enabling the cooling plate 40 to have a thicker central portion 53 for improved heat transfer, while having a relatively thinner flange 50 for bonding to the packaging 30.

As mentioned, present embodiments involve using a microsurface treatment to roughen at least the bonding surface 52 of a metal part (e.g., the flange 50 of the cooling plate 40) before overmolding a portion of the packaging 30 about the bonding surface 52 of the metal part. It is presently recognized that performing a microsurface treatment to the bonding surface of a metal part before overmolding significantly increases the strength of the bond and improves the quality of the seal (e.g., a water-tight seal, a gas-tight or hermetic seal) between the metal part 20 and the polymer packaging 30. It is believed that the increased surface area of the roughened bonding surface 52 of the metal part enables greater interaction between the roughened bonding surface 52 and the polymer packaging 30 during the overmolding process, and can yield a strong, water-tight and/or gas-tight seal between the polymer packaging 30 and the metal part 20.

Figure 5:
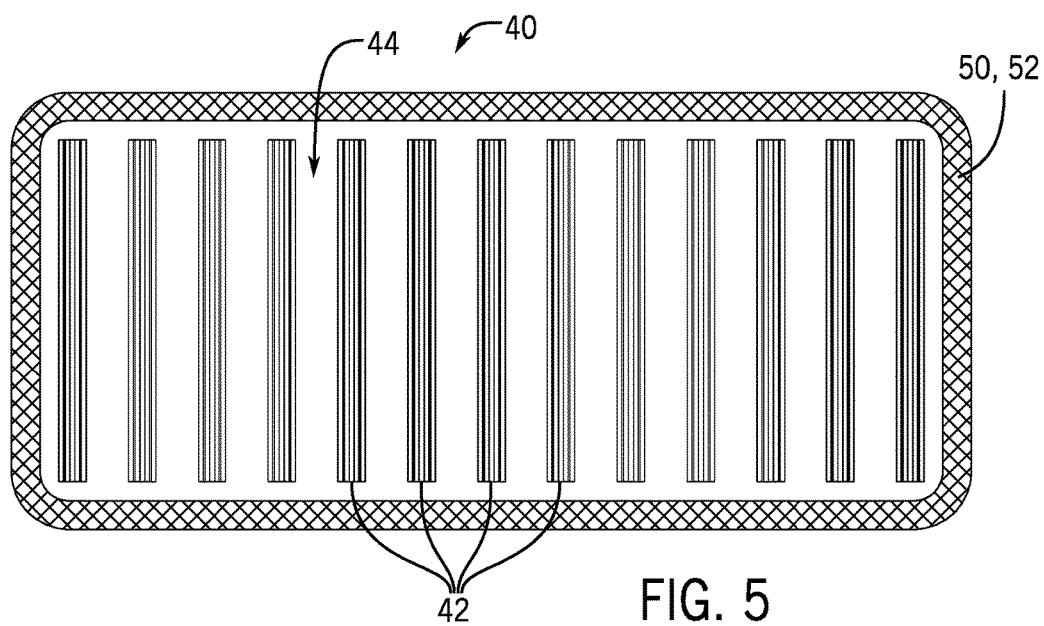
FIG. 5 is a schematic plan view of the cooling plate of FIG. 4 after selective microsurface treatment in preparation for overmolding, in accordance with embodiments of the present approach.

FIG. 5 is schematic plan view illustrating the portions of the cooling plate 40 of FIG. 4 that have been selectively roughened via microsurface treatment in preparation for overmolding, in accordance with embodiments of the present approach. As illustrated by the cross-hatching of FIG. 5, after microsurface treatment, the flange 50 has a substantially higher microsurface roughness. That is, during microsurface treatment, the cooling plate 40 has been specifically roughened on both the front side 44 (e.g., the exterior surface), as well as the back side or interior surface (not shown), of the cooling plate 40 along the flange 50. As such, when the polymer packaging 30 is subsequently overmolded about the cooling plate 40, the polymer packaging 30 directly contacts both the front side 44 (e.g., the exterior surface) and the back side or interior surface (not shown) of the cooling plate 40 along the flange 50. As discussed below, in certain embodiments, the entire cooling plate 40 or an entire side (e.g., the interior surface) may additionally receive the microsurface treatment prior to overmolding of the polymer packaging 30.

Figure 6:
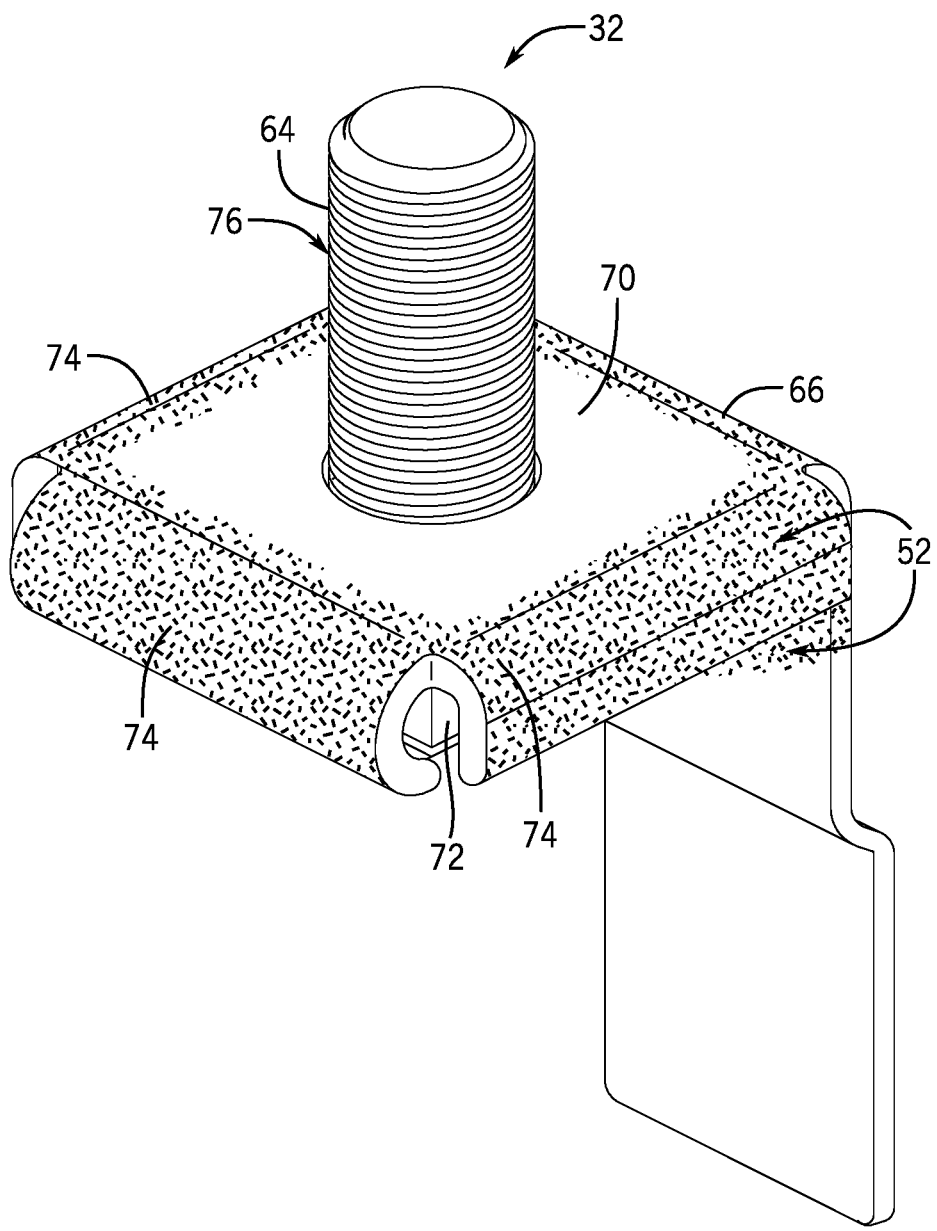
FIG. 6 is a perspective view of a terminal assembly after selective microsurface treatment in preparation for overmolding, in accordance with embodiments of the present approach.

FIG. 6 is a perspective view of a terminal assembly 32 that has been selectively roughened via microsurface treatment in preparation for overmolding, in accordance with embodiments of the present approach. In certain embodiments, the terminal assembly 32 may include copper, aluminum, nickel, stainless steel, or combinations thereof. Additionally, the terminal assembly 32 may be or may include features of the terminal assemblies disclosed in U.S. patent application Ser. No. 15/158,321, entitled, "SYSTEM AND METHOD OF OVERMOLDED TERMINAL POSTS OF A BATTERY MODULE," filed May 18, 2016, which is incorporated by reference in its entirety for all purposes. The illustrated terminal assembly 32 is designed to partially extend up from a portion of the polymer packaging 30 of the battery module 20 (e.g., a cover or a side portion of the battery module 20) and electrically couple to the battery cells 31 disposed inside the packaging 30. As such, when the illustrated terminal assembly 32 is overmolded, the bonding surface 52 of the terminal assembly 32, indicated by the dotted portions of the terminal assembly 32 illustrated in FIG. 6, are directly bonded to a portion of the polymer packaging 30 of the battery module 20 during overmolding. Alternatively, in certain embodiments, the terminal assembly 32 may be bonded or overmolded to a separate polymer insert that may subsequently bonded to (e.g., adhered to, welded to) other polymer pieces to form the polymer packaging 30.

The terminal assembly 32 illustrated in FIG. 6 includes a terminal post 64 that is secured within a bus bar 66. The illustrated terminal post 64 extends through (e.g., passes through, threaded through) an opening 68 in the central portion 70 of the bus bar 66 such that a base 72 of the terminal post 64 is secured against the underside of the central portion 70 of the bus bar 66. Further, the base 52 of the illustrated terminal post 64 is held into position by a number of flaps 74 of the bus bar 66, which are folded or curled around the edges of the base 72 to block or prevent movement (e.g., vertical movement, rotation) of the base 72 or the terminal post 64. The illustrated terminal post 64 also includes threads 76 to enable secure attachment of electrical connectors to the terminal assembly 32. It may be appreciated that, in other embodiments, the terminal assembly 32 may include a non-threaded terminal post 64, may include a terminal post 64 with a base 72 having a different shape, may include a bus bar 66 having a different shape, and/or may include other mechanisms for securing the terminal post 64 within the bus bar 66, in accordance with embodiments of the present disclosure.

As illustrated in FIG. 6, the bonding surface 52 of the terminal assembly 32 has been selectively roughened via microsurface treatment in preparation for overmolding. For example, in certain embodiments, only the bonding surface 52 of the terminal assembly 32 (e.g., only portions of the bus bar 66) may receive the disclosed microsurface treatment to improve bonding between the metal part 40 and the overmolded polymer (e.g., the packaging 30, or a polymer insert the forms part of the packaging 30). In certain embodiments, portions of the terminal assembly 32 may be roughened via microsurface treatment at different points during the manufacturing process. For example, in certain embodiments, before the terminal post 64 is loaded into the bus bar 66, the bus bar 66 may receive the microsurface treatment on the bonding surface 52 of the terminal assembly 32. In other embodiments, the entire surface of the bus bar 66 may receive the microsurface treatment before the terminal post 64 is loaded into the bus bar 66. In still other embodiments, the entire terminal assembly 32 (e.g., the bus bar 66 and the terminal post 64) may be roughed by the microsurface treatment before or after the terminal post 64 is loaded into and secured to the bus bar 66.

FIG. 7 is a flow diagram illustrating an example process 80 for manufacturing a battery module 20, as illustrated in FIG. 3, which includes at least one metal part (e.g., cooling plate 40 and/or terminal assembly 32) integrated into the polymer packaging 30 of the battery module 20, in accordance with embodiments of the present approach. The illustrated process 80 begins with microsurface treatment (block 82) to roughen at least the bonding surface of a metal part (e.g., bonding surface 52 of the cooling plate 40 or the terminal assembly 32). As discussed in detail below, in certain embodiments, the microsurface treatment may include etching at least the bonding surface 52 of the metal part. As mentioned, in general, the microsurface treatment results in a microsurface roughness that includes of micronscale and/or sub-micron scale features (e.g., regular or irregular features) that substantially increase the roughness of the exposed surface, which improves bonding during polymer overmolding.

The illustrated process 80 continues with overmolding (block 84) a portion of the polymer packaging 30 of a battery module 20 over the roughened bonding surface 52 of the metal part. For example, in certain embodiments, polypropylene polymer may be overmolded about the roughened bonding surface 52 of the metal part to form a portion of the packaging 30 of the battery module 20. As illustrated in FIG. 5, in certain embodiments, the bonding surface 52 of the metal part may include a front side 44 (e.g., an exterior surface) and back side (e.g., interior surface, not shown), and the overmolded polymer may cover and adhere to both the bonding surface 52 disposed on both the front side 44 and the back side of the part, effectively sandwiching the bonding surface 52 of the metal part 20 between two layers (e.g., an inner and outer layer) of overmolded polymer. In certain embodiments, a battery module 20 may include multiple metal parts (e.g., a cooling plate 40 and a terminal assembly 32) that are bonded to the polymer packaging 30, in accordance with the present technique.

The illustrated process 80 continues with disposing (block 86) internal components (e.g., battery cells, control circuitry, electrical interconnections) of the battery module 20 within the interior of the polymer packaging 30 and sealing the polymer packaging 30 to yield the battery module 20. As set forth above, for the example cooling plate 40 illustrated in FIGS. 3-5, overmolding may further hermetically seal the bonding surface of the metal part (e.g., both sides of the flange 50) to or within the polymer packaging 30 of the battery module 20. For example, the cooling plates 40 illustrated in FIG. 3 are disposed on the bottom portion 34 of the battery module 20. Therefore, utilizing the disclosed technique, the cooling plates 40 may be sufficiently secured to the battery module 20 such that the weight of the components resting on the cooling plates 40 (e.g., battery cells) does not cause the cooling plates 40 to move or break free from the polymer packaging 30. As mentioned above, in certain embodiments, thermal epoxy, a thermal pad, or another suitable thermal transfer material may be disposed between the battery cells of the battery module 20 and the cooling plate 40 to improve the thermal coupling between the two components.

Further, the disclosed metal parts (e.g., cooling plate 40 or terminal assembly 32) that have been integrated into the polymer packaging 30 according to the present approach, may be thermally or electrically coupled to internal components of the battery cell to provide their intended function (e.g., electrically connecting to the battery cells of the battery module 20, cooling the battery cells of the battery module 20). For example, after assembly of the battery module 20 is complete, the battery module 20 may be expected to pass quality control tests in which the battery module 20 is both sprayed with high-pressure water and submerged in water to verify the water-tight and/or air-tight nature of the seal between the cooling plate 40 and the polymer packaging 30. In certain embodiments, the battery module 20 may include multiple metal parts, such as the cooling plate 40 and the terminal assembly 32. For such embodiments, each metal part may be subjected to quality control testing to ensure that the packaging 30 of the battery module 20 is sufficiently strong and water-tight to meet the desired criteria of the battery manufacturer.

FIG. 8 is a flow diagram illustrating an example of a process 90 for microsurface treatment of a metal part (e.g., the cooling plate 40 of FIG. 5 or the terminal assembly 32 of FIG. 6), in accordance with embodiments of the present technique. In certain embodiments, the illustrated process 90 begins with (block 92) applying a masking material to protect portions of the surface of the metal part from receiving the microsurface treatment. For example, the masking material may be substantially inert or resistant to the microsurface treatment conditions and may be disposed over the non-bonding surface of the metal part so that only the bonding surface (e.g., the bonding surface 52) of the metal part is exposed to and roughened by microsurface treatment. In other embodiments, the masking step of block 92 may be skipped, and all surfaces of the metal part may be roughened by the microsurface treatment, avoiding the additional time and cost associated with masking portions of the metal part prior to microsurface treatment.

The process 90 illustrated in FIG. 8 continues by applying (block 94) etchant to at least the bonding surface 52 of the metal part. As mentioned, in certain embodiments, the entire surface of the metal part may receive the microsurface treatment. In certain embodiments, the etchant may include an acid, such as hydrochloric acid, sulfuric acid, acetic acid, nitric acid, hydrofluoric acid, or mixtures thereof. In other embodiments, the bonding surface 52 of the metal part may be roughened by laser etching, wherein electromagnetic radiation serves as the etchant. In general, the etchant may be any etchant that provides suitable micron-scale and/or sub-micron scale (e.g., nano-scale) features that substantially increase the micron-scale roughness of the exposed surface of the metal part. For laser etching in particular, it may be easier to control which portions of the metal part are contacted by the etchant via control of the laser, which may enable selective microsurface treatment of only the bonding surface 52 of the metal part without the use of the mask described in block 92.

The illustrated process 90 continues by allowing (block 96) the etchant to roughen the bonding surface 52 of the metal part for a predetermined amount of time. For example, while laser etching is nearly instantaneous, chemical etching (e.g., using an acid) is limited by diffusion. Therefore, for embodiments in which a chemical etchant is used, the etchant may be provided sufficient time to react with the exposed surface of the metal part for a predetermined amount of time (e.g., on the order of a few seconds to a few minutes) to impart the desired surface roughness to the exposed surface of the metal part.

The illustrated process 90 continues with washing (block 98) the roughened surface of the metal part (e.g., using water, detergent, organic solvent) to remove residual etchant and metal, as well as any remaining masking material. That is, while laser etching may vaporize the metal removed from the surface of the metal part, chemical etching (e.g., using an acid) can leave behind residual etchant and/or metal residue on the surface of the metal part. As such, in certain embodiments, the surface of the metal part may be washed with water or a suitable organic solvent to remove these residuals, as well as any remaining masking materials introduced in block 92, from the surface of the metal part. The washing step of block 98 generally prevents these residuals from interfering with bonding or adhesion to the polymer packaging 30 during subsequent overmolding, as described with respect to block 84 of FIG. 7. In certain embodiments, the metal part may undergo multiple etching, washing, and/or drying steps to prepare the metal part for overmolding, in accordance with the present disclosure. In certain embodiments, such as embodiments that involve laser etching, the washing step of block 98 may be skipped altogether.

It is presently recognized that, depending on the composition of the metal part, the roughening effect provided by the microsurface treatment may be short-lived (e.g., hours to days or weeks) before the microsurface features are substantially eroded, likely due to slow oxidation of the microsurface features. Accordingly, in certain embodiments, it may be desirable for the metal part to be overmolded within a predetermined amount of time (e.g., on the order of minutes to hours, or days to weeks) of roughing the surface of the metal part. Additionally, it may be appreciated that, even if the non-bonding surface of the metal part is roughened by the microsurface treatment, for certain types of metal parts, the bonding surface 52 that is buried under the polymer packaging 30 during overmolding remains in a substantially roughened state, while the microsurface features added to the remainder of the surface of the metal part may gradually erode over time. As such, since masking the metal part, as described in block 92 of FIG. 8, adds additional cost, time, and complexity to the microsurface treatment process, for certain metal parts, it may be more cost-effective to roughen the entire surface of the metal part, overmold the bonding surface 52 of the metal part with the polymer packaging, and allow the roughness on the remainder of the surface of the part to gradually fade. Furthermore, in certain embodiments, it may also be advantageous for certain features that are disposed on a non-bonding surface of the metal part to be roughened by microsurface treatment. For example, as mentioned, in certain embodiments, an interior surface of the cooling plate 40 may also receive the microsurface treatment along with the bonding surface 52, and may subsequently be coated with a thermal epoxy before the electrochemical cells 31 are disposed within the packaging 30. For such embodiments, the increased surface area/roughness of the internal surface of the cooling plate 40 may generally improve bonding strength and/or heat transfer between the thermal epoxy the cooling plate 40, improving the effectiveness of the cooling plate 40. By further example, in certain embodiments, the heat fins 42 of the cooling plates 40 illustrated in FIGS. 3-5 may be advantageously roughened by the microsurface treatment process to increase the surface area of these heat fins 42, improving their ability to dissipate heat to the surrounding environment.

One or more of the disclosed embodiments, alone or on combination, may provide one or more technical effects including the manufacture of battery modules having metallic features (e.g., cooling plates, terminal assemblies) bonded to a portion of the polymer packaging of the battery modules. Present embodiments enable methods for overmolding portions of a metal part to effectively seal (e.g., form a water-tight and/or gas-tight seal between) the metal part to a portion of the polymer packaging of a battery module. Disclosed embodiments include the microsurface modification of at least a bonding surface of the metal part before overmolding polymer about the bonding surface. The present technique is applicable any metal part of a battery module (e.g., terminal, interconnect, structural support) that is suitable for polymer overmolding. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A battery module, comprising:
   a polymer packaging having an interior and exterior;
   a plurality of battery cells disposed within the interior of the polymer packaging; and
   a terminal assembly of the battery module that extends from the interior to the exterior of the polymer packaging and is in electrical contact with terminals of the plurality of battery cells, wherein the terminal assembly comprises a terminal post coupled to a bus bar and a bonding surface that is secured to an overmolded portion of the polymer packaging, wherein the bonding surface has a microsurface roughness that hermetically seals the bonding surface of the terminal assembly to the overmolded portion of the polymer packaging, and the microsurface roughness comprises micron-scale features, sub-micron-scale features, or a combination thereof, that facilitate the hermetic sealing of the bonding surface of the terminal assembly to the overmolded portion of the polymer packaging, and wherein the bus bar includes the microsurface roughness.

2. The battery module of claim 1, wherein the terminal assembly comprises aluminum, nickel, or copper, or combinations thereof.

3. The battery module of claim 1, wherein the polymer packaging consists essentially of polypropylene.

4. The battery module of claim 1, wherein an entire surface of the terminal assembly, including the bonding surface, includes the microsurface roughness.

5. A battery module, comprising:
a polymer packaging;
a plurality of battery cells disposed within the polymer packaging; and
a pair of terminal assemblies electrically coupled to the plurality of battery cells, wherein each of the terminal assemblies comprises a respective terminal post extending through and secured to a respective bus bar, wherein the bus bar of the terminal assembly comprises a bonding surface secured to an overmolded portion of the polymer packaging, wherein the bonding surface of the terminal assembly comprises a microsurface roughness that hermetically seals the bonding surface of the terminal assembly to the overmolded portion of the polymer packaging, and wherein each respective terminal post comprises a respective threaded portion that extends from a top surface of the polymer packaging.

6. The battery module of claim 5, wherein the battery module comprises a cold plate coupled to a bottom surface of the polymer packaging and thermally coupled to the plurality of battery cells, wherein the cold plate includes a bonding surface overmolded by a second portion of the polymer packaging, wherein the bonding surface of the cold plate comprises a microsurface roughness that enables the bonding surface of the cold plate to hermetically seal to the overmolded portion of the polymer packaging.

7. The battery module of claim 5, wherein the overmolded portion of the polymer packaging is a separate polymer insert bonded to a remainder of the polymer packaging.

8. The battery module of claim 5, wherein the battery module is configured to provide electrical power to an xEV.

9. The battery module of claim 5, wherein only a portion of each respective bus bar comprises the microsurface roughness.

10. The battery module of claim 5, wherein an entire surface of each respective bus bar comprises the microsurface roughness.

11. The battery module of claim 1, wherein only the bus bar of the terminal assembly includes the microsurface roughness.

12. The battery module of claim 1, wherein an entire surface of the terminal post and bus bar of the terminal assembly includes the microsurface roughness.

13. The battery module of claim 1, wherein the overmolded portion of the polymer packaging is a separate polymer piece that is insert bonded to a remainder of the polymer packaging.

14. The battery module of claim 12, wherein a portion of the surface of the terminal assembly is configured to lose the microsurface roughness after a duration of exposure to air.

15. The battery module of claim 1, wherein the microsurface roughness comprises sub-micron-scale features.

16. The battery module of claim 1, wherein the microsurface roughness comprises nano-scale features.

* * * * *